United States Patent [19]
Balakirshnan

[11] Patent Number: 5,982,639
[45] Date of Patent: *Nov. 9, 1999

[54] TWO SWITCH OFF-LINE SWITCHING CONVERTER

[75] Inventor: Balu Balakirshnan, Saratoga, Calif.

[73] Assignee: Power Integrations, Inc., Sunnyvale, Calif.

[*] Notice: This patent is subject to a terminal disclaimer.

[21] Appl. No.: 08/964,191

[22] Filed: Nov. 4, 1997

[51] Int. Cl.$^6$ .............................. H02M 3/335; G05F 1/10
[52] U.S. Cl. ................................ 363/21; 363/41; 363/95; 323/222
[58] Field of Search ............................... 323/222; 363/20, 363/21, 22, 84, 95, 97, 127, 41

[56] References Cited

U.S. PATENT DOCUMENTS

| | | | |
|---|---|---|---|
| 3,491,252 | 1/1970 | Petrohilos | 307/229 |
| 3,555,399 | 1/1971 | Buchanan et al. | 321/43 |

(List continued on next page.)

FOREIGN PATENT DOCUMENTS

| | | | |
|---|---|---|---|
| WO 83/01157 | 3/1983 | European Pat. Off. | H02M 3/335 |
| 0 651 440 A1 | 5/1995 | European Pat. Off. | H01L 23/433 |
| 0 694 966 A1 | 1/1996 | European Pat. Off. | H01L 23/495 |
| 0 736 957 A1 | 10/1996 | European Pat. Off. | H02M 1/12 |
| 0 740 491 A1 | 10/1996 | European Pat. Off. | H05B 41/00 |
| 0 748 034 A1 | 12/1996 | European Pat. Off. | H02M 3/00 |
| 0 748 035 A1 | 12/1996 | European Pat. Off. | H02M 3/155 |
| 0 751 621 A1 | 1/1997 | European Pat. Off. | H03K 17/06 |

OTHER PUBLICATIONS

H.S. Hoffman, Jr., "Self–Generated Bias Supply", *IBM Technical Disclosure Bulletin*, vol. 20, No. 5 Oct. 1997, pp. 1814–1815.

H.S. Hoffman, Jr. et al, "Proportional Drive Supply with Diversion Control", *IBM Technical Disclosure Bulletin*, vol. 21, No. 12, May 1979, pp. 4904–4905.

A. Halperin, "Primary Regulated Dual Power Supply", *IBM Technical Disclosure Bulletin*, vol. 21, No. 10, Mar. 1979, pp. 4299–4300.

"5–W dc–dc converters aim at telecomm applications", *Electronics Design*, vol. 31, No. 15, Jul. 21, 1983, pp. 227.

"Combined Switch–Mode Power Amplifier and Supply", *IBM Technical Disclosure Bulletin*, vol. 28, No. 3, Aug. 1985, pp. 1193–1195.

(List continued on next page.)

*Primary Examiner*—Adolf Deneke Berhane
*Attorney, Agent, or Firm*—Blakely Sokoloff Taylor & Zafman, LLP

[57] ABSTRACT

A power supply comprises a bridge rectifier with an input and an output, the input of the bridge rectifier coupled to an AC power supply signal, the output comprising positive and negative terminals; a first inductor comprises a first terminal and a second terminal, the first terminal coupled to the positive terminal of the output of the bridge rectifier; a first switch comprises a first terminal, a second terminal and a control terminal, the first terminal of the switch coupled to the second terminal of the first inductor, the second terminal of the switch coupled to the negative terminal output of the bridge rectifier and the switch being switched on and off at a first duty cycle according to a signal received at the control terminal; a first diode comprising an anode terminal and a cathode terminal, the anode terminal coupled to the first terminal of the switch; a first capacitor comprises a first terminal and second terminal, the first terminal coupled to the cathode of the first diode and the second terminal coupled to the negative terminal of the output of the bridge rectifier, the first capacitor adapted to supply power to a load coupled to the power supply; and a pulse width modulation controller with a first input and a first output, the first input of the pulse width modulation controller coupled to the first terminal of the first capacitor and the first output of the pulse width modulation controller coupled to the control terminal of the switch.

27 Claims, 11 Drawing Sheets

U.S. PATENT DOCUMENTS

| | | | |
|---|---|---|---|
| 3,840,797 | 10/1974 | Aggen et al. | 321/2 |
| 3,916,224 | 10/1975 | Daniels et al. | 307/265 |
| 4,072,965 | 2/1978 | Kondo | 354/51 |
| 4,143,282 | 3/1979 | Berard, Jr. et al. | 307/43 |
| 4,228,493 | 10/1980 | de Sartre et al. | 363/56 |
| 4,236,198 | 11/1980 | Ohsawa et al. | 363/49 |
| 4,495,554 | 1/1985 | Simi et al. | 363/21 |
| 4,559,590 | 12/1985 | Davidson | 363/21 |
| 4,622,627 | 11/1986 | Rodriguez et al. | 363/37 |
| 4,695,936 | 9/1987 | Whittle | 363/21 |
| 4,706,176 | 11/1987 | Kettschau | 363/21 |
| 4,706,177 | 11/1987 | Josephson | 363/24 |
| 4,720,641 | 1/1988 | Faini | 307/18 |
| 4,725,769 | 2/1988 | Cini et al. | 323/283 |
| 4,734,839 | 3/1988 | Barthold | 363/16 |
| 4,739,462 | 4/1988 | Farnsworth et al. | 363/21 |
| 4,806,844 | 2/1989 | Claydon et al. | 323/311 |
| 4,809,148 | 2/1989 | Barn | 363/20 |
| 4,811,184 | 3/1989 | Koninsky et al. | 363/17 |
| 4,814,674 | 3/1989 | Hrassky | 318/254 |
| 4,858,094 | 8/1989 | Barlage | 363/21 |
| 4,862,339 | 8/1989 | Inou et al. | 363/21 |
| 4,866,590 | 9/1989 | Odaka et al. | 363/49 |
| 4,870,555 | 9/1989 | White | 363/21 |
| 4,887,199 | 12/1989 | Whittle | 363/49 |
| 4,888,497 | 12/1989 | Dallabora et al. | 307/272.3 |
| 4,890,210 | 12/1989 | Myers | 363/21 |
| 4,928,220 | 5/1990 | White | 363/56 |
| 4,937,728 | 6/1990 | Leonardi | 363/97 |
| 4,943,903 | 7/1990 | Cardwell, Jr. | 363/97 |
| 5,012,401 | 4/1991 | Barlage | 363/97 |
| 5,014,178 | 5/1991 | Balakirshnan | 363/49 |
| 5,034,871 | 7/1991 | Okamoto et al. | 363/15 |
| 5,041,956 | 8/1991 | Marinus | 363/21 |
| 5,072,353 | 12/1991 | Feldtkeller | 363/20 |
| 5,086,364 | 2/1992 | Leipold et al. | 361/18 |
| 5,146,394 | 9/1992 | Ishii et al. | 363/16 |
| 5,161,098 | 11/1992 | Balakirshnan | 363/144 |
| 5,177,408 | 7/1991 | Marques | 315/291 |
| 5,200,886 | 4/1993 | Schwarz et al. | 363/49 |
| 5,297,014 | 3/1994 | Saito et al. | 363/21 |
| 5,313,381 | 5/1994 | Balakirshnan | 363/147 |
| 5,394,017 | 2/1995 | Catano et al. | 307/66 |
| 5,452,195 | 9/1995 | Lehr et al. | 363/21 |
| 5,461,303 | 10/1995 | Leman et al. | 323/222 |
| 5,481,178 | 1/1996 | Wilcox et al. | 323/287 |
| 5,508,602 | 4/1996 | Borgato et al. | 323/222 |
| 5,528,131 | 6/1996 | Marty et al. | 323/901 |
| 5,541,828 | 7/1996 | Rozman | 363/21 |
| 5,552,746 | 9/1996 | Danstrom | 327/427 |
| 5,563,534 | 10/1996 | Rossi et al. | 327/77 |
| 5,568,084 | 10/1996 | McClure et al. | 327/538 |
| 5,570,057 | 10/1996 | Palara | 327/365 |
| 5,572,156 | 11/1996 | Diazzi et al. | 327/109 |
| 5,617,016 | 4/1997 | Borghi et al. | 323/284 |
| 5,619,403 | 4/1997 | Ishikawa et al. | 363/21 |
| 5,621,629 | 4/1997 | Hemminger et al. | 363/56 |
| 5,640,317 | 6/1997 | Lei | 363/49 |
| 5,673,185 | 9/1997 | Albach et al. | 363/45 |
| 5,712,772 | 1/1998 | Telefus et al. | 363/21 |
| 5,736,842 | 4/1998 | Jovanovic | 323/222 |
| 5,781,421 | 7/1998 | Steigerwald et al. | 363/21 |

OTHER PUBLICATIONS

R. Bruckner, et al, "Optimizing Converter Design and Performance Utilizing Micro Controller System Feedback Control", *Proceedings of Powercon 8,* E–2, 1981, pp. 1–10.

B. Pelly et al, "Power MOSFETs take the load off switching supply design", *Electronic Design,* Feb. 1983, pp. 135–139.

D. Azzis et al, "Flyback on Card Power Supply", *IBM Technical Disclosure Bulletin,* vol. 23, No. 4, Sep. 1980, pp. 1477–1478.

A.J. Bowen et al, "Power Supply with Optical Isolator", *IBM Technical Disclosure Bulletin,* vol. 14, No. 11, Apr. 1972, pp. 3320.

"Off–Line Power Supply Control Technique Using a Single Transformer to Feed Back Three Control Signals", *IBM Technical Disclosure Bulletin,* vol. 32, No. 8A, Jan. 1990, pp. 272–273.

TWO SWITCH OFF-LINE SWITCHING CONVERTER

BACKGROUND

1. Field of the Invention

The invention relates to a switch mode power supply capable of power factor correction, and further to a monolithic device capable of power factor correction and power supply regulation.

2. Background

With the ever growing demand upon power systems by the use of electronic devices which consume power non-linearly, the amount of apparent power that needs to be delivered is greatly increasing. One of the major problems associated with non-linear power supplies is the harmonic distortion of the current in the power supply grid. That is, non-linear power supplies convert the AC mains signal to a DC signal which results in a non-sinusoidal current being injected into the power grid. The non-sinusoidal character of the current is measured both in terms of power factor of the power supply and the harmonic content of the current waveform.

The production of a non-sinusoidal current can be understood with reference to FIG. 1. In FIG. 1, the AC Mains voltage 5 is input through an Electromagnetic Interference (EMI) filter 10 and a bridge rectifier 15. Bridge rectifier 15 feeds a rectified voltage into capacitor 25 which is used to maintain a substantially DC voltage 17. DC voltage 17 is maintained constant except for a ripple component 27 (FIG. 2A) since there is a certain discharge from capacitor 25 due to the time constant (T) of the capacitor 25, is not sufficiently more than the inverse of the frequency of the AC mains voltage 5 to prevent some voltage discharge. As can be seen in FIG. 2A, the ripple component 35 will at certain times have a magnitude greater than the instantaneous magnitude of AC mains voltage 5. This will cause periods when no current flows through bridge rectifier 15, and the current 22 (FIG. 2B) at the input of bridge rectifier 15 will be discontinuous causing harmonic distortion and a poor power factor. A clamping circuit comprising a zener diode 30 and a diode 35 is used to protect MOSFET 100 from over voltages. Power supply regulation is performed using a flyback topology well known in the art.

The discontinuous current waveforms injected into the power grid can cause the neutral wiring to overload and burn. Further, the harmonic currents cause an under utilization of electrical distribution and generation equipment, thereby increasing the cost of power generation to the utility. Further problems associated with harmonic currents include errors in utility metering equipment, malfunctioning of utility relays, and interference with communication and control signals in nearby lines.

The problems associated with harmonic currents in utility systems have led to the formation of various national and international organizations that are directed toward creating standards to limit harmonic currents for various classes of non-linear power devices. One such organization is the International Electrotechnical Commission, which issued the IEC 1000-3-2 standard that calls for various maximum levels for harmonic currents. These harmonic currents are currents at frequencies which are whole number multiples of the AC mains line frequency.

The harmonic currents created by the circuit described in FIG. 1 is usually far in excess of the requirements of the IEC 1000-3-2 standards. Thereby, power supplies are being designed to improve the harmonic currents. The improvements generally include using added circuitry to decrease the current waveform distortion and to reduce the periods when there is no current flowing through bridge rectifier 15.

Referring to FIG. 3, a modified power supply circuit incorporating a separate power factor correction stage 120 along with a flyback stage 20 is depicted. The power factor correction stage 120 includes a switch mode power supply regulation chip 195, which can be a TOPSWITCH® device manufactured by Power Integrations, Inc. Chip 195 has three terminals which includes a control terminal 196. The input into control terminal 196 is a current 200 which is a combination of a current 191 which is proportional to the instantaneous rectified voltage and a feedback current 192. Feedback current 192 will be zero until the voltage of capacitor 185 reaches a voltage greater than the reverse break down voltage of zener diodes 150 and 155. In a typical power supply this voltage is typically 400 volts. As the current 200 increases, the duty cycle of the MOSFET in chip 195 decreases.

The MOSFET current 198 is comprised of series of triangular pulses each having a duty cycle. The frequency of triangular pulses, which generally ranges between 25 and 200 kHz, is very high compared to the frequency of a half wave rectified AC Mains voltage 200 which is at 100 Hz (2×50 Hz) or 120 Hz (2×60 Hz). The average MOSFET current 198 which is the average of the triangular pulses is both continuous and a distorted sinusoid when viewed over a single period of the 100 Hz rectified AC mains signal. The diode current 199 is also a series of triangular pulses, the pulses being complimentary to the triangular pulses of the MOSFET current 198. Therefore, average diode current 199 is also both continuous and a distorted sinusoid when viewed over a single period of the 100 Hz half wave AC mains signal.

The average input current waveform 197 at the input of bridge rectifier 15 is kept substantially sinusoidal by allowing current to flow through the MOSFET that has a shape which forms a complete sinusoidal current waveform when added to the average diode current 199 flowing through the boost diode 155 as can be seen in FIG. 4.

Capacitor 25 filters both the high frequency currents due to device 195 and the line frequency ripple to provide a substantially DC output voltage. Capacitor 125 is appropriately sized to prevent the high frequency switching of chip 195 from affecting the input current 197.

The values of capacitor 180, resistors 160, 165, and 170 determine the dominant pole of the power factor correction stage 120. The dominant pole is generally set at approximately 10 Hz. The frequency of the dominant pole is used to maintain the feedback current 192 at a constant level within an AC Mains half cycle of 100 Hz. Maintaining current 200 at a constant level would create a duty cycle which is constant in each AC Mains half cycle which in turn would generate an average MOSFET current 198 flowing through chip 195 that would itself be sinusoidal. As such, the input current 197 would not be sinusoidal since it would be the sum of a sinusoidal average MOSFET current 198 and a non-sinusoidal average diode current 199. To compensate for the fact that a constant feedback current 192 would create an average MOSFET current 198 that is sinusoidal, a feed forward scheme is employed using a feed forward current 191 through resistor 190 that varies the duty cycle linearly with the instantaneous rectified AC line voltage magnitude as can be seen in FIG. 5. This way the average MOSFET current 198 is distorted and the resulting input current 197 is maintained as sinusoidal.

The flyback converter stage 20 is operated like a conventional flyback converter stage with a second TOPSWITCH device using optocoupler feedback. The flyback converter can also be replaced with a forward converter.

Power Factor Correction stages of the type described with respect to FIG. 3 have been able to achieve power factors in excess of 0.95 and Total Harmonic Distortions less than 9%. However, the addition of a power factor correction stage is costly in terms of components which results in a far larger bill of materials and power supply size, as can be seen by comparing the number of components in FIG. 1 to the number of components in FIG. 3. Further, the additional components decrease the reliability of the power supply.

Another problem associated with conventional power supplies is that the power supplies operate and draw power even when the device that they are supplying is in a "sleep mode". In a computer, a conventional power supply will operate drawing large amounts power even if the computer is utilizing only minimum power in "standby" or "sleep" mode. By drawing a large amount of power when the system is not operating, power costs to the end user increases without deriving any appreciable benefits.

Therefore, it is desired to create a power supply which performs both power factor correction and power supply regulation.

It is further desired to create a power supply which can perform both power factor correction and power supply regulation while minimizing the need for additional components.

It is additionally desired to create a power supply which has standby functionality to decrease power consumption and associated costs for end users.

SUMMARY OF THE INVENTIONS

The present invention is directed toward a low cost power supply capable of power factor correction and load power regulation with a minimum number of components at a low cost.

In a preferred embodiment present invention is directed toward a power supply comprising a bridge rectifier comprising an input and an output, the input of the bridge rectifier coupled to an AC power supply signal, the output comprising positive and negative terminals; a first inductor comprising a first terminal and a second terminal, the first terminal of the first inductor coupled to the positive terminal of the output of the bridge rectifier; a first switch comprising a first terminal, a second terminal and a control terminal, the first terminal of the switch coupled to the second terminal of the first inductor, the second terminal of the switch coupled to the negative terminal output of the bridge rectifier and the switch being switched on and off at a first duty cycle according to a signal received at the control terminal; a first diode comprising an anode terminal and a cathode terminal, the anode terminal of the first diode coupled to the first terminal of the switch; a first capacitor having a first terminal and second terminal, the first terminal of the first capacitor coupled to the cathode of the first diode and the second terminal of the first capacitor coupled to the negative terminal of the output of the bridge rectifier, the first capacitor adapted to supply power to a load coupled to the power supply; and a pulse width modulation controller comprising a first input and a first output, the first input of the pulse width modulation controller coupled to the first terminal of the first capacitor and the first output of the pulse width modulation controller coupled to the control terminal of the switch.

Another aspect of the present invention is directed toward a power supply comprising a transformer comprising a primary winding, a secondary winding, and a core, the primary winding comprising a first terminal and a second terminal, the secondary winding comprising a first terminal and a second terminal; a bridge rectifier comprising an input and an output comprising a positive terminal and a negative terminal a first inductor comprising a first terminal and a second terminal, the first terminal of the first inductor coupled to the positive terminal of the output of the bridge rectifier; a first diode comprising a cathode terminal and an anode terminal, the anode terminal of the first diode coupled to the second terminal of the first inductor and the cathode terminal of the first diode coupled to the first terminal of the primary winding; a first capacitor comprising a first terminal and a second terminal, the first terminal of the first capacitor coupled to the first terminal of the primary winding, the second terminal of the first capacitor coupled to the negative terminal of the output of the bridge rectifier; a second diode comprising a cathode terminal and an anode terminal, the anode terminal of the second diode coupled to a first terminal of the secondary winding; a second capacitor comprising a first terminal and a second terminal, the first terminal of the second capacitor coupled to the cathode terminal of the second diode and the second terminal of the second capacitor coupled to second terminal of the secondary winding; a pulse width modulation controller comprising a first input and a second input, the first input of the pulse width modulation controller coupled to the first terminal of the first capacitor and the second input of the second pulse width modulator coupled to receive a signal indicative of a power, voltage or current supplied by the power supply, the pulse width modulation controller further comprising a first output producing a first drive signal responsive to the first input and a second output producing a second drive signal responsive to the second input; a first switch comprising a first terminal, a second terminal and a control terminal, the first terminal of the first switch coupled to the second terminal of the inductor, the second terminal of the second switch coupled to the second terminal of the first capacitor and the control terminal coupled to the second output of the pulse width modulator, wherein the first switch turns on and off according to the first drive signal; and a second switch comprising a first terminal, a second terminal and a control terminal, the first terminal of the second switch coupled to the second terminal of the primary winding, the second terminal of the second switch coupled to the second terminal of the first capacitor and the control terminal coupled to the second output of the pulse width modulator, wherein the first switch turns on and off according to the first drive signal.

Yet another aspect of the present invention is directed toward a power supply controller comprising a first switch being switched on and off at a first duty cycle; a second switch being switched on and off at a second duty cycle; and a pulse width modulation controller comprising a first output coupled to the first switch and a second output coupled to the second switch, the pulse width modulation controller providing a first signal that switches the first switch at the first duty cycle and providing a second signal that switches the second switch at the second duty cycle.

The above and other preferred features of the inventions, including various novel details of implementation and combination of elements will now be more particularly described with reference to the accompanying drawings and pointed out in the claims. It will be understood that the particular methods and structures embodying the invention are shown for illustration only and not as limitations of the present inventions. As will be understood by those skilled in the art the principles and features of the inventions may be employed without departing from the scope of the invention.

DETAILED DESCRIPTION OF THE PREFERRED EMBODIMENT

Figure 6:
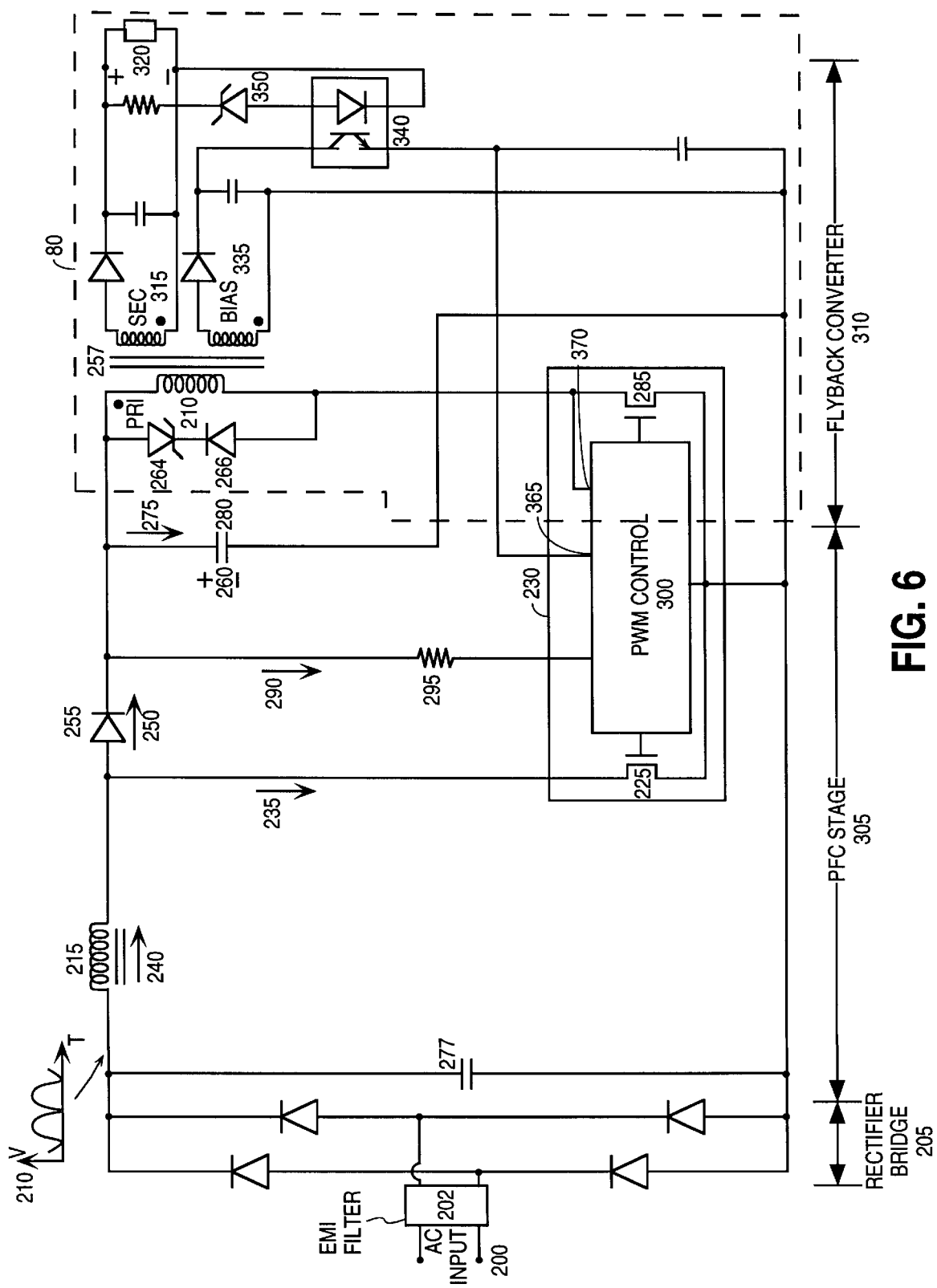
FIG. 6 is a power supply according to a preferred embodiment of the present invention.

Referring to FIG. 6, an AC Mains signal 200 is input through an EMI filter 202 to a bridge rectifier 205 which outputs a rectified signal 210. At a terminal of a boost inductor 215, there is a connection to the negative terminal of the output of the bridge rectifier through a first MOSFET 225 that acts as a switch. First MOSFET 225 is preferably part of a functional block 230. Functional block 230 contains circuitry for performing both power factor correction and power supply regulation functions and is preferably a single monolithic integrated circuit. Alternatively, two separate functional blocks each comprising a MOSFET and a pulse width modulation controller can be used in place of a single functional block. The two separate functional blocks may be monolithic integrated circuits or may be comprised of discrete components.

Figure 7A:
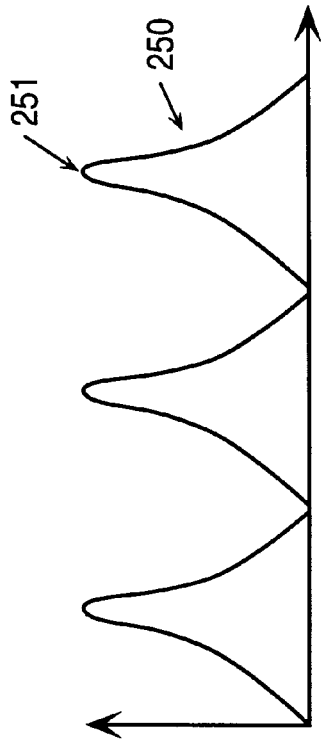
FIG. 7A is a diagram of the average current through the boost diode of FIG. 7 according to a preferred embodiment of the present invention.

To maintain a sinusoidal current waveform at the input of bridge rectifier 205, the average first MOSFET current 235 flowing through first MOSFET 225, is varied over a AC Mains half cycle in order to maintain an average boost inductor current 240 that is substantially sinusoidal. To maintain an average boost inductor current 240 as being substantially sinusoidal, the average first MOSFET current 235 should be maintained as a difference between a sinusoidal waveform and the average boost diode current 250 which flows through boost diode 255. In the embodiment of FIG. 6, the average value of boost diode current 250 which is a distorted sinusoid is shown in FIG. 7A.

Figure 7B:
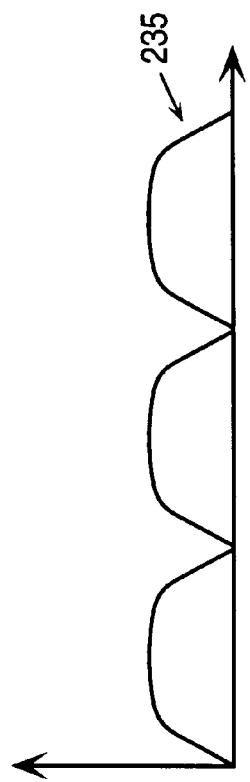
FIG. 7B is a diagram of the average current though the first MOSFET 235 of FIG. 7 according to a preferred embodiment of the present invention.
Figure 7C:
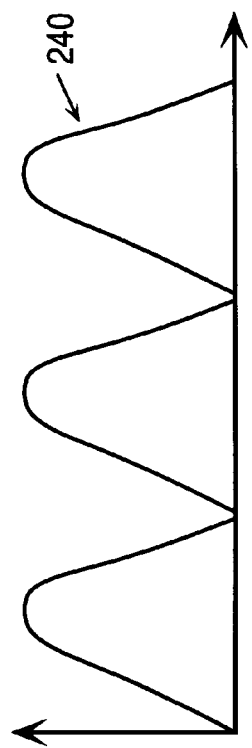
FIG. 7C is a diagram of the average current though the boost inductor of FIG. 7 according to a preferred embodiment of the present invention.

Power factor correction is performed by compensating the distortion in the average diode current 255 by the average first MOSFET current 235 as can be seen in FIG. 7B. At the peak level 251 of the average boost diode current 250 (FIG. 7A), the duty cycle of first MOSFET 225 is reduced to decrease the average value of first MOSFET current 235. By reducing the duty cycle of the first MOSFET 225 at the peak of the average boost diode current 250, the average boost inductor current 250 (which is the sum of the average boost diode current 250 and the average first MOSFET current 235) is maintained as a substantially sinusoidal waveform on a cycle by cycle basis (FIG. 7C).

The average first MOSFET current 235 is shaped by varying the duty cycle of first MOSFET 225 inversely with the capacitor voltage 260 of capacitor 285. This is because the capacitor voltage 260 varies with the average boost diode current 250. The capacitor voltage 260 generates a resistor current 290 which varies with the average boost diode current 250. The resistor current 290 is input into pulse width modulation controller 300, and the duty cycle of the first MOSFET 225 is varied according to the magnitude of the resistor current 290. For instance, as the resistor current 290 increases, the duty cycle of first MOSFET 225 will decrease. In turn, this causes the average first MOSFET current 235 to decrease. Since the average boost diode current 250 is decreasing at the same time that the first MOSFET current 235 is decreasing, the overall waveform shape of the average boost inductor current 240 will be closer to sinusoidal. In this way, the average first MOSFET current 235 when combined with the average current boost diode 250 creates a substantially sinusoidal boost inductor current 240 which is output by the power supply.

As previously stated, the duty cycle of first MOSFET 225 is inversely proportional to the resistor current 290. The magnitude of the resistor current 290 is inversely proportional to the resistance of resistor 295. The duty cycle of the first MOSFET 225 is then a function of the value of the resistor 295. For instance, a larger value of resistor 295 will increase the duty cycle of first MOSFET 225 due to the lower magnitude of the resistor current 290. In power supply applications, the value of resistor 295 should be selected depending on the required average DC capacitor voltage 260. The magnitude of the capacitor voltage 260 is greater than the peak value of the rectified voltage 210. Typically, the capacitor voltage 260 is approximately equal to 400 Volts for a 230 Volts AC Mains voltage and is approximately equal to 200 Volts for a 115 Volts AC Mains voltage.

Figure 8:
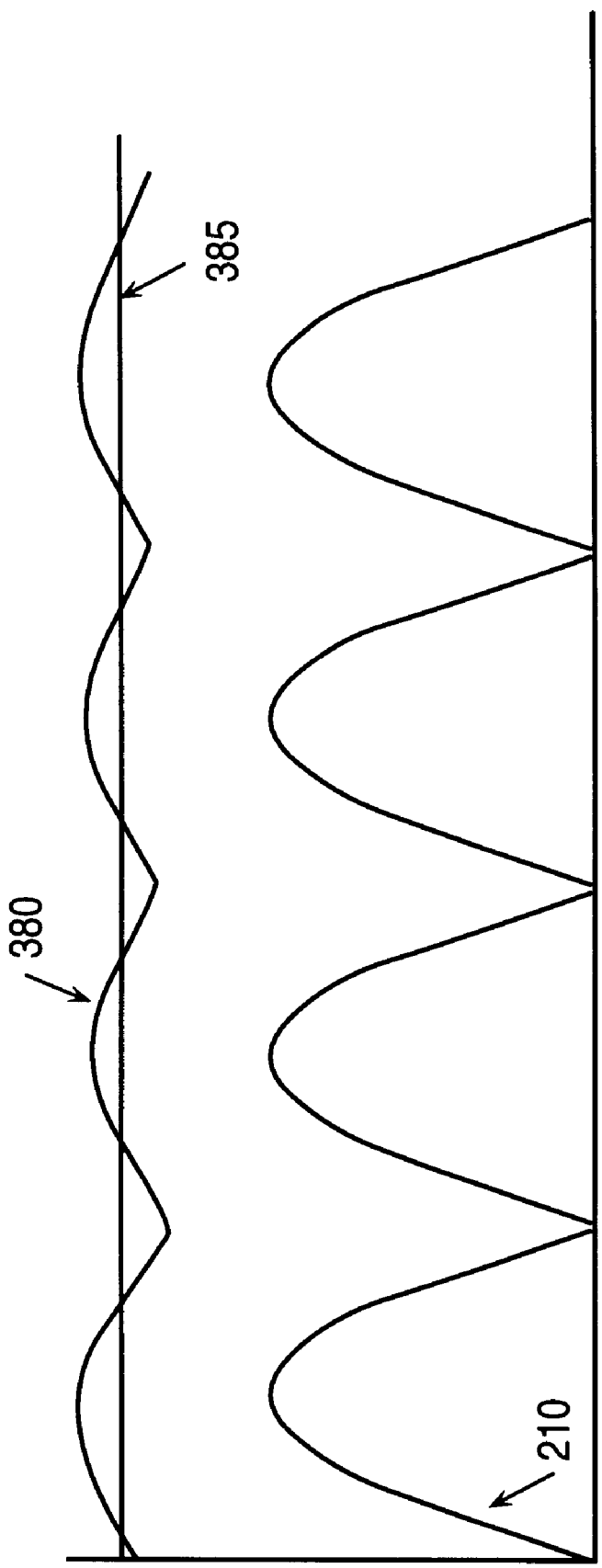
FIG. 8 is diagram of the capacitor voltage of FIG. 6 including a ripple component according to a preferred embodiment of the present invention.

A ripple component 380 (FIG. 8) of capacitor voltage 260, which is superimposed upon DC component 385 (FIG. 8), has a shape similar to the instantaneous magnitude of the rectified voltage 210. That is, when the instantaneous magnitude of the rectified voltage 210 reaches its peak value the ripple component of capacitor voltage 260 also reaches its peak value thereby reducing the duty cycle of MOSFET 225 which reduces the average first MOSFET current 235 (FIG.

7B). In this way, the introduction of a ripple component 380 to the capacitor voltage 260 reduces the duty cycle of first MOSFET 225 as the average diode current 240 is peaking and this will partially compensate for the distortion present in the average diode current 250 so that the average boost inductor current will more accurately follow the instantaneous value of the rectified voltage 210, thereby improving the power factor. The variance in ripple component 380 is a function of the capacitance of capacitor 280, which allows the level of power factor correction to be a design parameter that can be changed by adjusting the value of capacitor 280.

In the power supply of FIG. 6, the frequency of the dominant pole of the power factor correction stage 305 is based upon the component values of capacitor 280 and the load. The capacitor 280 functions as both the output filter capacitor for the power factor correction stage 305 and the loop compensation capacitor for the power factor correction stage 305, thereby eliminating the need for the additional capacitor 180 which was required in FIG. 3. Further, the dominant pole of the circuit of FIG. 6 reduces any overshoot of voltage 260 at start-up. Additionally, the dominant pole of the circuit of FIG. 6 reduces the susceptibility of voltage 260 to transient variations due to changes in the load. This is because any change in the voltage 260 which is the voltage at the node of the dominant pole will be quickly corrected by the power factor correction stage 305 as the rest of the loop will be much faster than the node of the dominant pole.

A high frequency capacitor 277 having an appropriate capacitance value is used at the output of bridge rectifier 205 to by pass the high frequency switching components of the first MOSFET current 235, from passing through the bridge rectifier 205 to the AC Mains.

A clamping circuit comprising a zener diode 264 and a diode 266 is used to prevent voltage spikes caused by the leakage inductance of the transformer 257 from damaging the MOSFET 285, as in prior art power supplies.

Functional block 230 also regulates the output voltage supplied by the flyback converter stage 310 to a load 320 located at a secondary winding 315 by use of a second MOSFET 285. The duty cycle of MOSFET 285 is varied by an optocoupler current 375, which is indicative of the voltage supplied to the load, output from an optocoupler 340 that is received at second control terminal 365. The optocoupler current will be substantially zero until the voltage at the output terminals 320 rises above the reverse breakdown voltage of zener diode 350. As long as the voltage at load 340 is greater than the reverse breakdown voltage of the zener diode 350, a current will flow into second control terminal 365 reducing the duty cycle of second MOSFET 285 which reduces the power stored by transformer 257 which in turn reduces the voltage supplied to load 320 and keeps it in regulation.

A bias winding 335 is used to provide bias voltage to optocoupler 340 so that it can supply an optocoupler current 375 to second control terminal 365 that varies according to deviation of the voltage of load 320 from the regulated value.

Optocoupler feedback is one of many possible methods of feedback regarding the voltage, current, or power delivered to the load that can be used by the present invention. Other feedback methods can be used by the present invention without deviating from the scope and teachings of the present invention so long as the feedback topology used provides a signal proportional to the load voltage, current, or power.

Additionally, other types of topologies for power supply stage 310 such as buck or buck-boost topologies can be used with the present invention without departing from the scope of the present invention.

Figure 1:
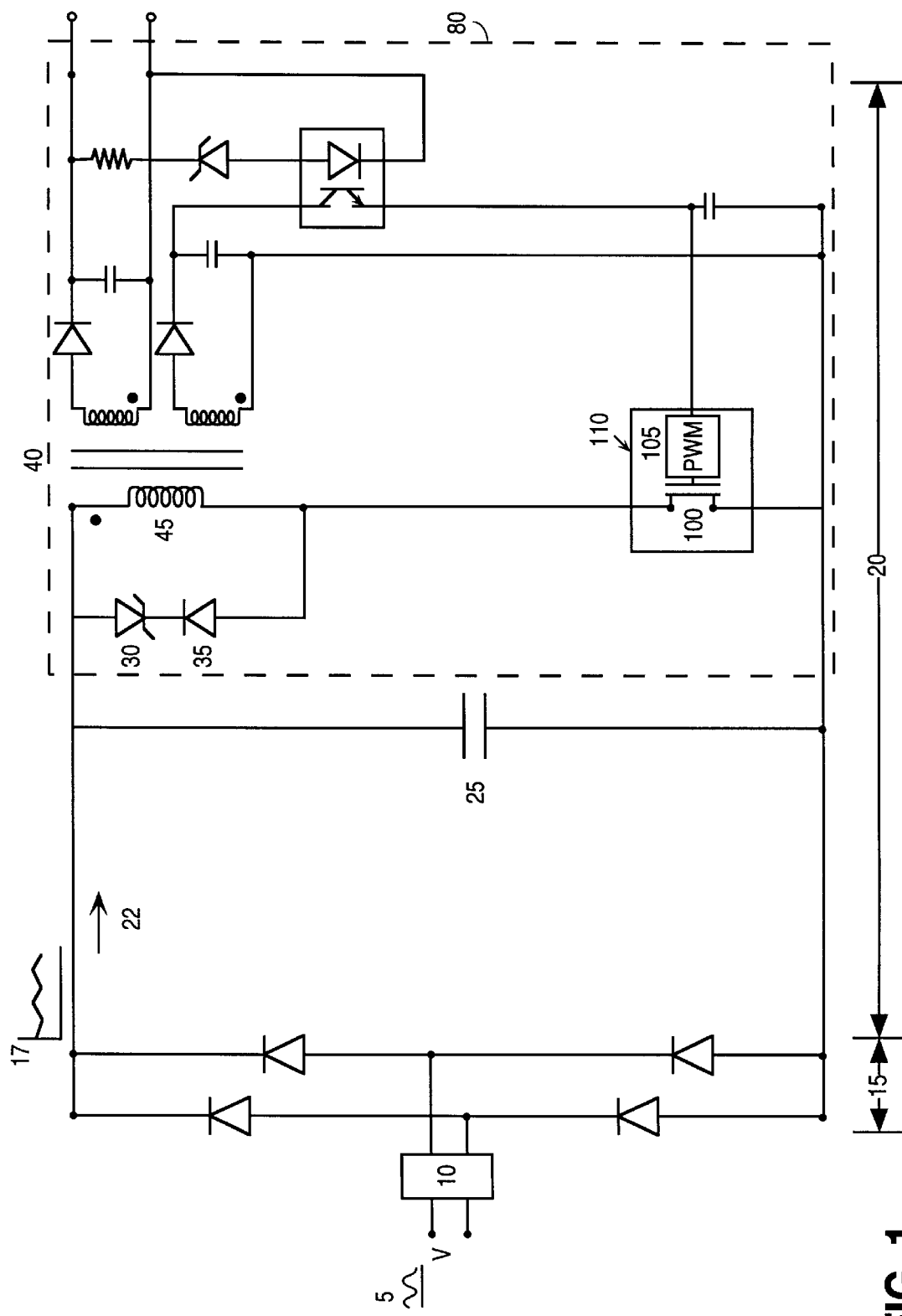
FIG. 1 is a prior art flyback power supply with switch-mode regulation.
Figure 2A:
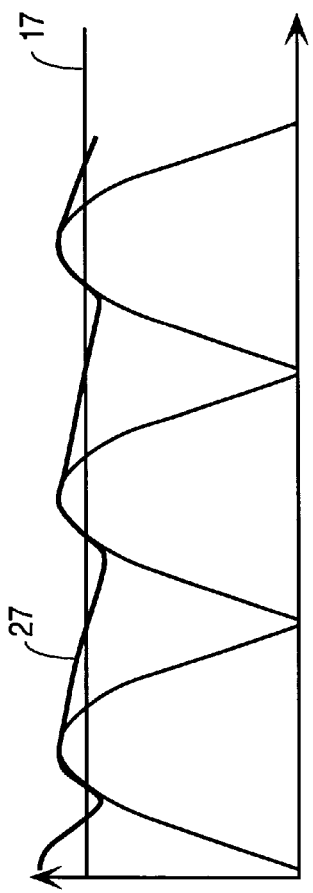
FIG. 2A is a diagram of a rectified AC Mains voltage generated by the prior art flyback power supply of FIG. 1.
Figure 2B:
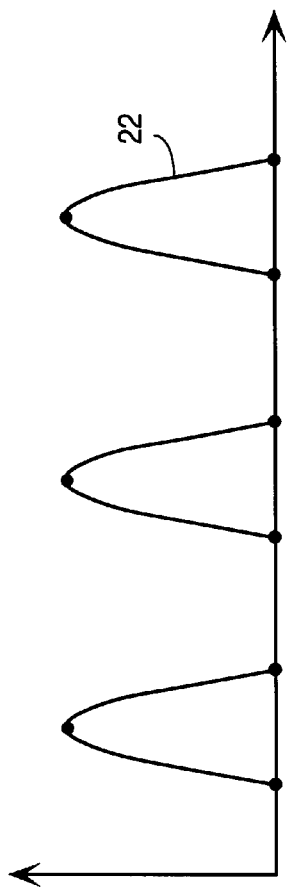
FIG. 2B is a diagram of a current drawn from the AC Mains generated by the prior art flyback power supply of FIG. 1
Figure 3:
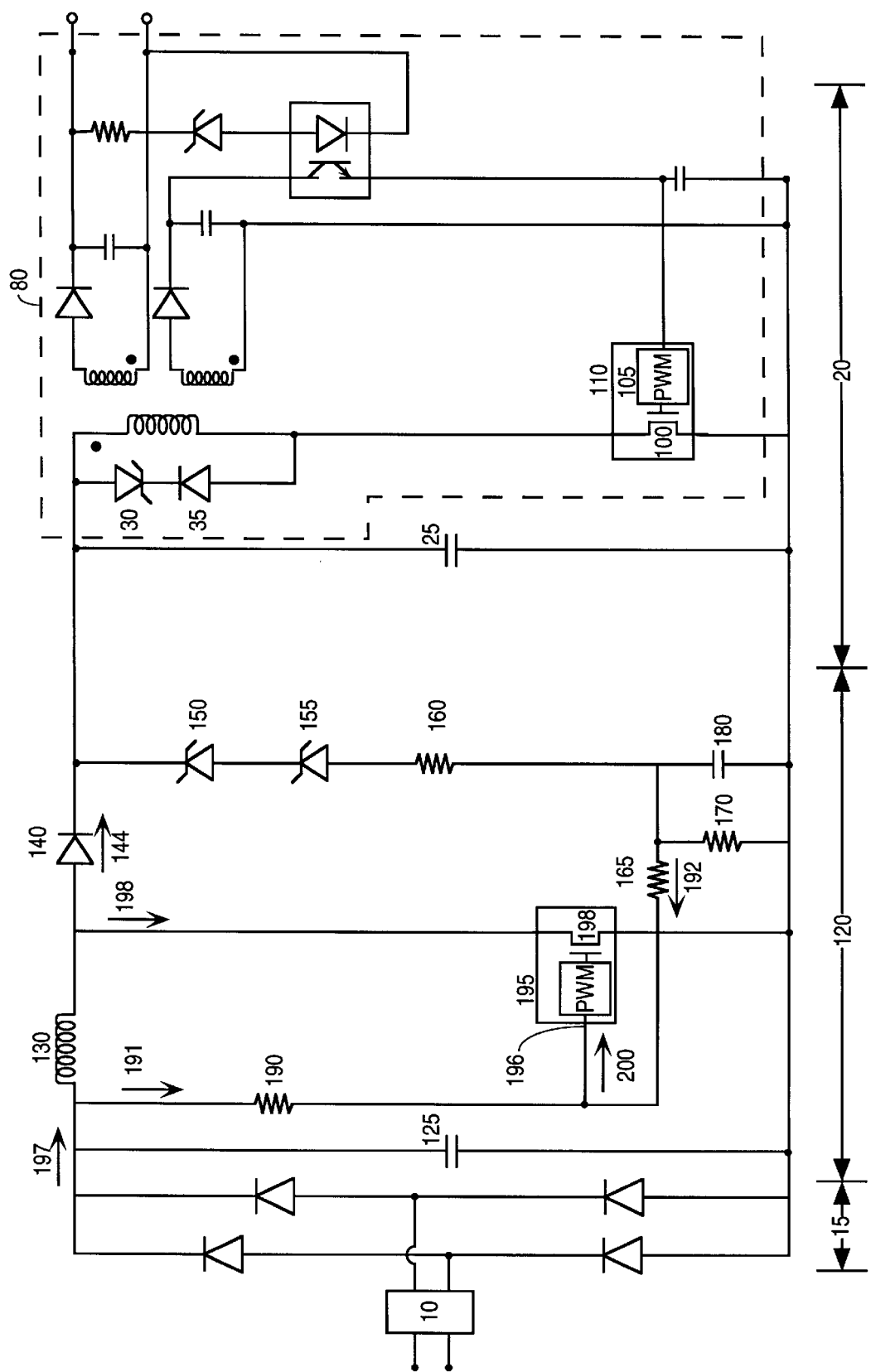
FIG. 3 is an embodiment of a prior art power supply circuit incorporating a separate power factor correction stage and a power supply regulation stage.
Figure 4:
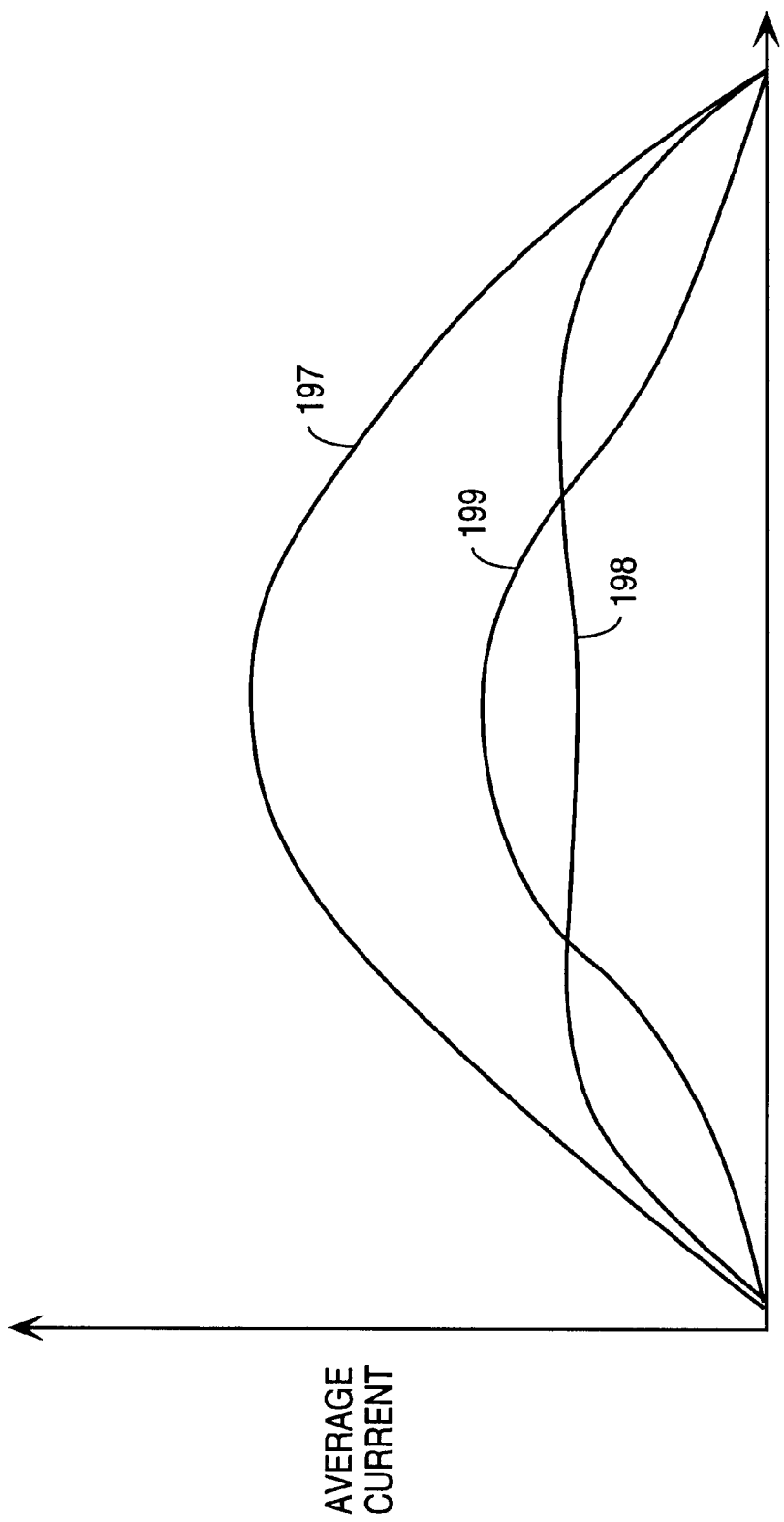
FIG. 4 depicts the average current waveforms that are generated in the prior art power factor correction stage of FIG. 3.
Figure 5:
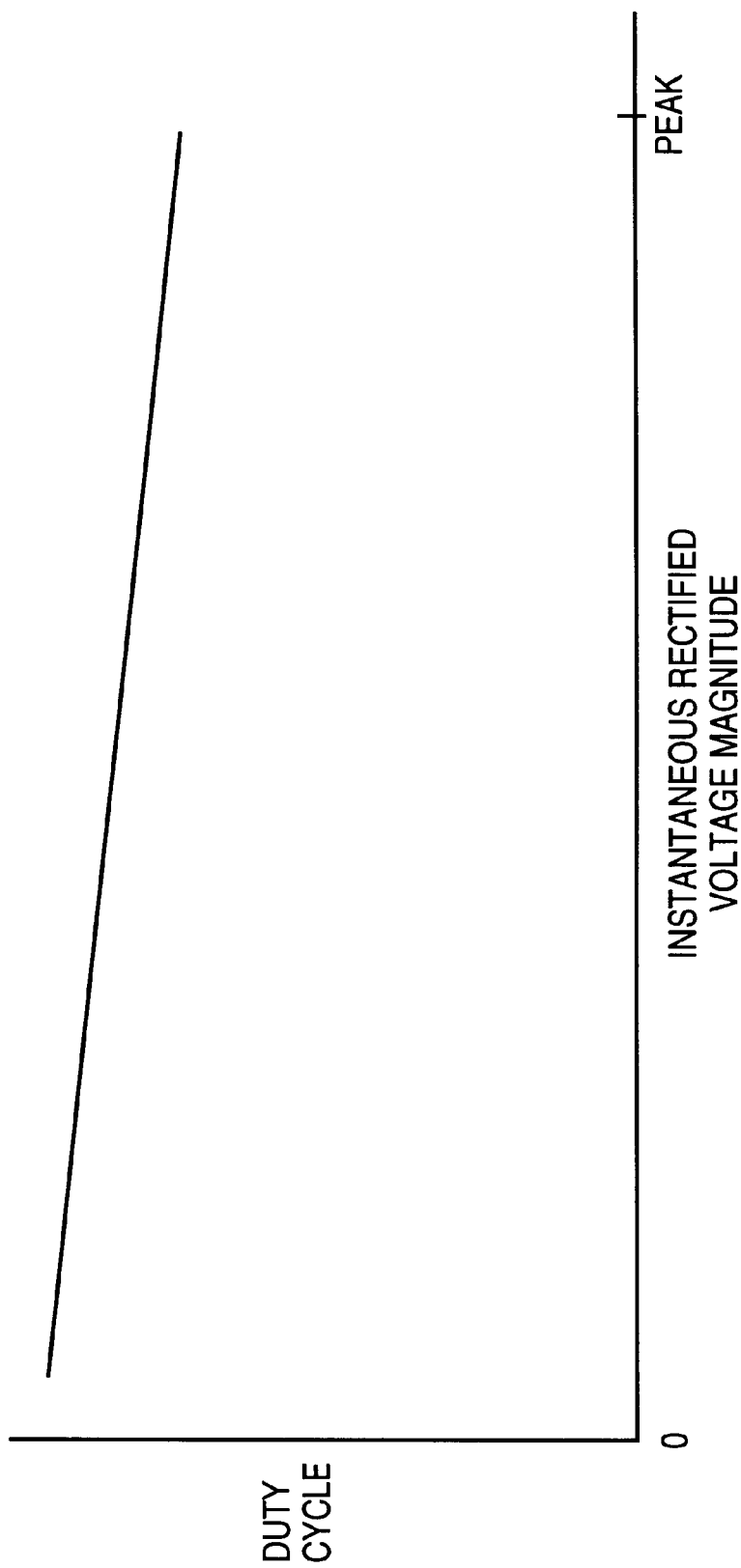
FIG. 5 depicts the relationship of the switch duty cycle to the instantaneous AC Mains voltage in the prior art power factor correction stage of FIG. 3.

As can be seen by comparing the power supply of FIG. 3 to the power supply of FIG. 6, the number of components used in a power supply according to a preferred embodiment of the present invention is less than the number of components needed in prior art combined power factor correction and power supply regulation systems. The need for fewer components greatly decrease the bill of material costs for power supply manufacturers and reduces the costs of the power supply. Further, the use of fewer components increases the reliability of the power supply as well as reducing its size.

Referring again to FIG. 6, pulse width modulation controller 300 includes a connection terminal 370 which is coupled to the primary winding 390. A current flowing into connection terminal 370 when the MOSFET 285 is non-conducting can be used to provide power to pulse width modulation controller 300 during start-up. An embodiment of one type of apparatus and method for designing a configuration for providing power to pulse width modulation through connection terminal 370 is disclosed in commonly owned U.S. Pat. No. 5,014,178 which is incorporated herein by reference in its entirety.

Figure 9:
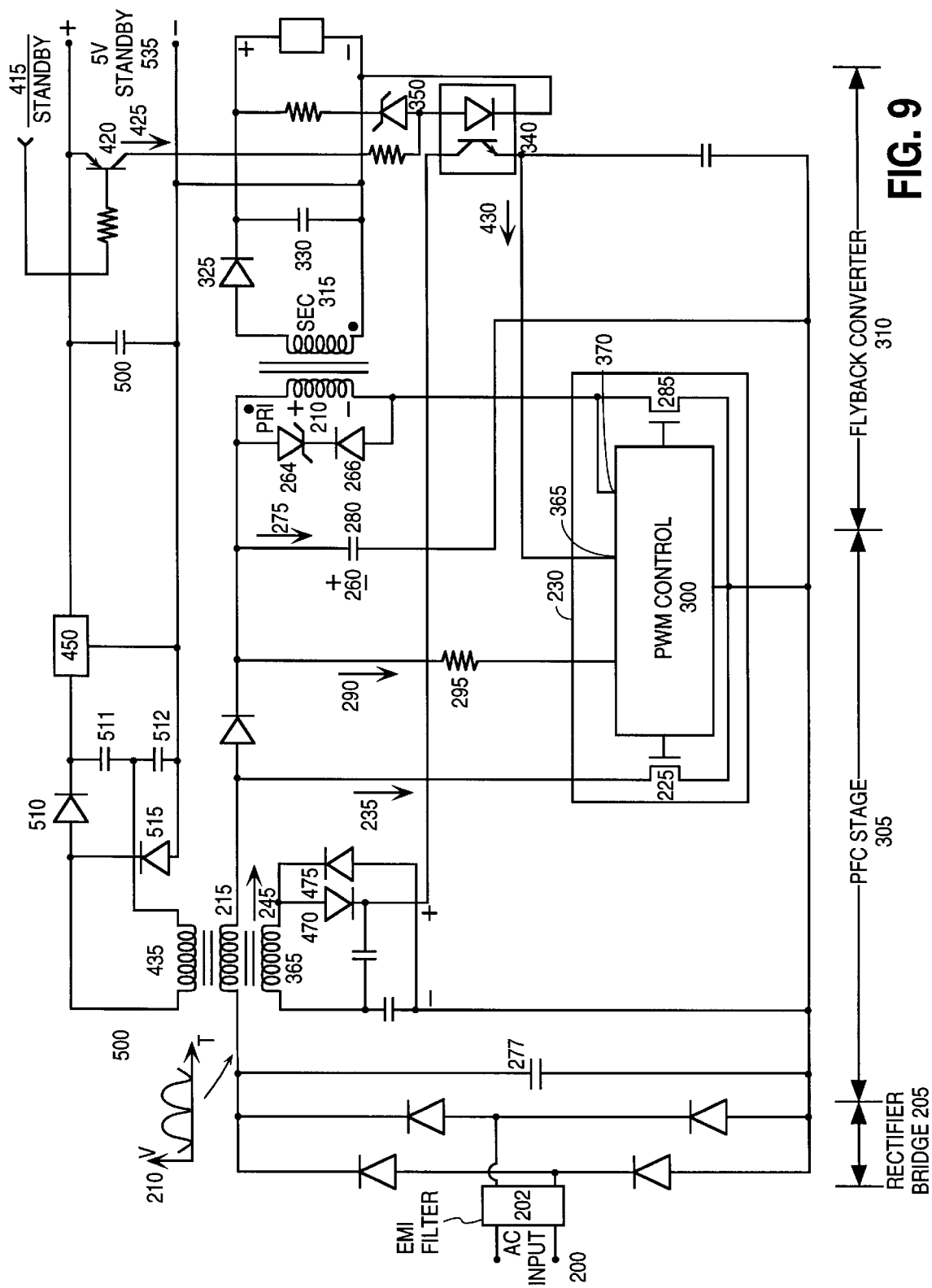
FIG. 9 is an alternate embodiment of a power supply with standby functionality according to a the present inventions.

FIG. 9 is an embodiment of the invention that includes a low power standby circuit 400. Power Factor Correction Stage 305 operates in the same manner as described with respect to FIG. 6 and FIGS. 7A–7C. Flyback converter stage 310 also regulates the output voltage in the same manner as described with respect to FIG. 6 when the device to which power is being supplied is in a non-standby mode.

When the load is turned off, a standby signal 415 is fed into the base of transistor 420, which in turn drives a large current 425 into the optocoupler 340, which induces an optocoupler current 450 which is sufficient to reduce the duty cycle of MOSFET 285 to zero. With second MOSFET 285 off, no current flows in the primary winding of transformer 257 and therefore no power is delivered through secondary winding 315 to the load. This condition will continue as long as the standby signal 415 is being fed to the base of transistor 420. Once the standby signal 415 is removed, normal power supply regulation using optocoupler feedback is resumed. During the time when the standby signal 415 is being fed into the base of transistor 420, power is being supplied to the load through standby terminals 535. The power supplied through standby terminals 535 is generally less than the power supplied through secondary winding 315 during normal operation. In a preferred embodiment, the stand-by voltage level is preferably five (5) volts. The standby voltage is supplied through standby inductor 435 which is coupled to boost inductor 215. Since inductor 215 is always conducting an AC current, power can be supplied through standby circuit 400, even when the primary winding is not conducting.

The standby stage 500 includes diodes 510 and 515, and capacitors 511 and 512 which are arranged with respect to standby inductor 435 so that the voltage at the input of linear regulator 525 is proportional to regulated voltage 260. This voltage is further regulated to a slightly lower voltage by linear regulator 525, such that a substantially DC voltage with a desired magnitude, preferably five volts, is maintained at the standby terminals 535. Further, a standby capacitor 520 is added in order to better maintain a DC waveform at standby terminals 535.

In the embodiment of FIG. 9, bias winding 365 is magnetically coupled to boost inductor 215 as opposed to primary winding 390. This is done so that voltage may be supplied to optocoupler 340, thereby allowing operation even when no power is delivered by transformer 257 in standby mode. In the embodiment of FIG. 9, the voltage induced at bias winding 365 is rectified using diodes 470 and 475.

It should be noted that the power factor correction stage 305 is operating whether power is being supplied to the load through transformer 257 or through standby circuit 400. In this way the power factor and low current harmonic distortion are maintained by the power supply regardless of the mode of operation. Further, when the flyback stage 310 is not operating in the embodiments of FIG. 9 the first MOSFET 225 can be operated at a lower frequency than when flyback stage 310 is operating, which increases the efficiency of the power supply in the low power standby state.

Figure 10:
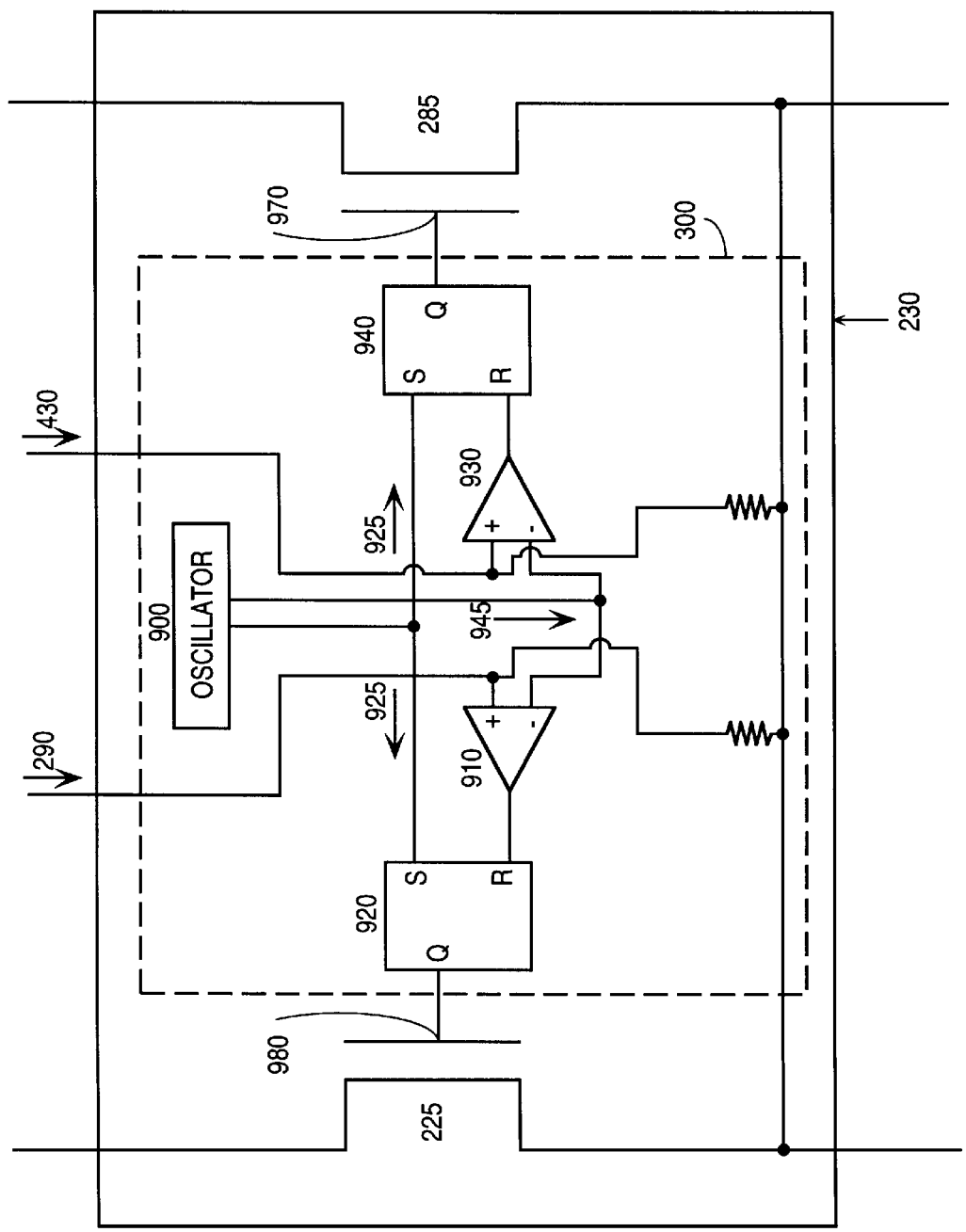
FIG. 10 is an integrated device that performs power factor correction and power supply regulation according to a preferred embodiment of the present invention.

Referring to FIG. 10, a preferred embodiment of function block 230 is depicted. First MOSFET 225 and second MOSFET 285 are controlled by a single pulse width modulation controller 300. Pulse Width Modulation circuit 300 includes a single oscillator 900 that feeds the same saw toothed waveform into comparator 910 and comparator 930. Further, oscillator 900 feeds an identical clock signal 925 into latches 920 and 940.

Figure 11A:
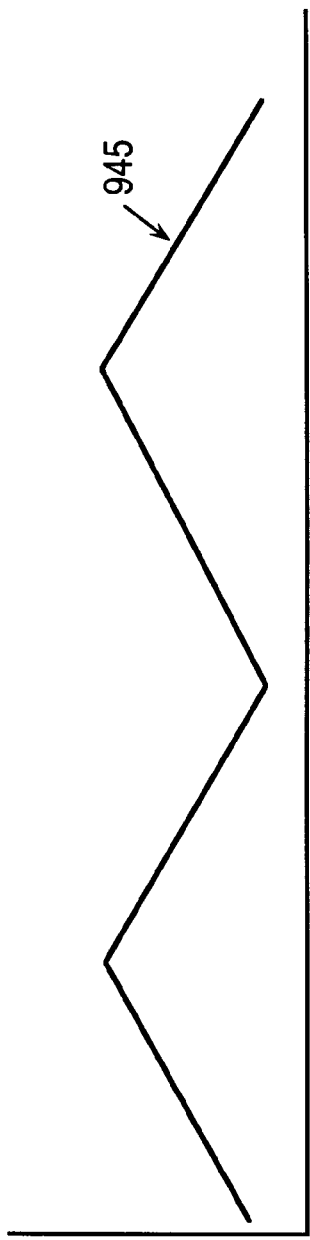
FIG. 11A is a diagram of a triangular waveform input into the comparators of FIG. 11 according to a preferred embodiment of the present invention.
Figure 11B:
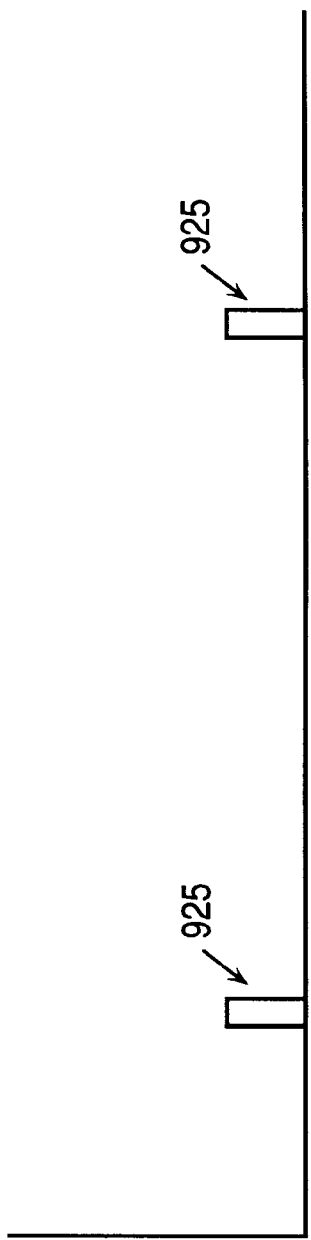
FIG. 11B is a diagram of a clock signal of FIG. 11 according to a preferred embodiment of the present invention.

Comparator 910 receives a voltage that is proportional to the resistor current 290 and is compared to the saw toothed waveform 940 (FIG. 11A). At the beginning of a clock cycle, in response to clock signal 925, a signal is sent to first MOSFET gate 960 latching on first MOSFET 225 (FIG. 11B). As long as the voltage that is proportional to the resistor current 290 is less than the instantaneous magnitude of the saw toothed waveform 940, first MOSFET 225 is on, and first MOSFET current 235 is flowing (FIG. 7). If the voltage that is proportional to the resistor current 290 is greater than the instantaneous magnitude of the saw toothed waveform 940, MOSFET 225 is turned off.

With respect to comparator 930, the saw toothed waveform 940 is compared to a voltage proportional to optocoupler current 430 (FIG. 11A). At the beginning of a clock cycle, a signal is sent to the second MOSFET gate 970 latching on MOSFET 285 (FIG. 11B). As long as the voltage proportional to optocoupler current 430 is less than the instantaneous magnitude of the saw toothed waveform 940, first MOSFET 225 is on, and first MOSFET current 235 is flowing. If the voltage proportional to optocoupler current 430 is greater than the instantaneous magnitude of the saw toothed waveform 940, MOSFET 225 is turned off In this way, a single monolithic device is capable of being used to regulate the output power delivered by a power supply as well as the power factor correction stage. By being able to regulate the output of power delivered as well as the power factor in a single low cost unit, a power supply can be manufactured which has an improved power factor at little or no added cost.

While the embodiments, applications and advantages of the present invention have been depicted and described, there are many more embodiments, applications and advantages possible without deviating from the spirit of the inventive concepts described herein. The invention should only be restricted in accordance with the spirit of the claims appended hereto and is not restricted by the preferred embodiments, specification or drawings.

What is claimed is:

1. A power supply comprising:
    a rectifier comprising an input and an output, said input of said rectifier coupled to an AC power source, said output comprising positive and negative terminals;
    a first inductor comprising a first terminal and a second terminal, said first terminal of said first inductor coupled to said positive terminal of said output of said rectifier;
    a first switch comprising a first terminal, a second terminal and a control terminal, said first terminal of said switch coupled to said second terminal of said first inductor, said second terminal of said switch coupled to a said negative terminal of said output of said rectifier and said switch being switched on and off at a first duty cycle according to a signal received at said control terminal;
    a first diode comprising an anode terminal and a cathode terminal, said anode terminal of said first diode coupled to said first terminal of said switch;
    a first capacitor having a first terminal and second terminal, said first terminal of said first capacitor coupled to said cathode of said first diode and said second terminal of said first capacitor coupled to said negative terminal of said output of said rectifier, said first capacitor adapted to supply power to a load coupled to said power supply, wherein said first capacitor is both a filter capacitor and a loop compensation capacitor of the power supply; and
    a pulse width modulation controller comprising a first input and a first output, said first input of said pulse width modulation controller coupled to said first terminal of said first capacitor and said first output of said pulse width modulation controller coupled to said control terminal of said switch.

2. The power supply of claim 1 wherein said first capacitor further comprises a voltage, said voltage comprising a ripple component.

3. The power supply of claim 2 wherein said ripple component varies according to a capacitance of said first capacitor.

4. The power supply of claim 1 wherein a dominant pole of said power supply comprises said first capacitor.

5. The power supply of claim 1 further comprising a second capacitor comprising a first terminal and a second terminal wherein said first terminal of said second capacitor is coupled to said first terminal of said inductor and said second terminal of said second capacitor coupled to said negative terminal of said output of said rectifier.

6. The power supply of claim 1 wherein said pulse width modulation controller further comprises a second input coupled to a signal indicative of a power, voltage or current supplied at a load coupled to said power supply and a second output, said power supply further comprising a second switch comprising a control terminal, a first terminal and a second terminal, said control terminal of said second switch coupled to said second output of said pulse width modulation controller, said second terminal of said second switch coupled to ground and said first terminal of said second switch coupled to control said power supplied at said load, voltage or current.

7. The power supply of claim 6 wherein said first switch and said second switch each comprise a transistor.

8. A power supply comprising:
    a transformer comprising a primary winding, a secondary winding, and a core, said primary winding comprising a first terminal and a second terminal, said secondary winding comprising a first terminal and a second terminal;
    a rectifier comprising an input and an output comprising a positive terminal and a negative terminal a first inductor comprising a first terminal and a second terminal, said first terminal of said first inductor coupled to said positive terminal of said output of said rectifier;

a first diode comprising a cathode terminal and an anode terminal, said anode terminal of said first diode coupled to said second terminal of said first inductor and said cathode terminal of said first diode coupled to said first terminal of said primary winding;

a first capacitor comprising a first terminal and a second terminal, said first terminal of said first capacitor coupled to said first terminal of said primary winding and said second terminal of said first capacitor coupled to said negative terminal of said output of said rectifier, wherein said first capacitor is both a filter capacitor and a loop compensation capacitor of the power supply;

a second diode comprising a cathode terminal and an anode terminal, said anode terminal of said second diode coupled to a first terminal of said secondary winding;

a second capacitor comprising a first terminal and a second terminal, said first terminal of said second capacitor coupled to said cathode terminal of said second diode and said second terminal of said second capacitor coupled to second terminal of said secondary winding;

a pulse width modulation controller comprising a first input and a second input, said first input of said pulse width modulation controller coupled to said first terminal of said first capacitor and said second input of said second pulse width modulator coupled to receive a signal indicative of a power, voltage or current supplied by said power supply, said pulse width modulation controller further comprising a first output producing a first drive signal responsive to an input at said first terminal and a second output producing a second drive signal responsive to an input at said second terminal;

a first switch comprising a first terminal, a second terminal and a control terminal, said first terminal of said first switch coupled to said second terminal of said inductor, said second terminal of said first switch coupled to said second terminal of said first capacitor and said control terminal coupled to said first output of said pulse width modulator, wherein said first switch turns on and off according to said first drive signal; and a second switch comprising a first terminal, a second terminal and a control terminal, said first terminal of said second switch coupled to said second terminal of said primary winding, said second terminal of said second switch coupled to said second terminal of said first capacitor and said control terminal coupled to said second output of said pulse width modulator, wherein said second switch turns on and off according to said second drive signal.

9. The power supply of claim 8, further comprising a high frequency capacitor coupled across said positive and negative terminals of said output of said rectifier.

10. The power of supply of claim 8, further comprising a resistor, said resistor coupled between said first terminal of said first capacitor and said first input of said pulse width modulator.

11. The power supply of claim 8, wherein said transformer further comprises a bias winding comprising a first terminal and a second terminal, said power supply further comprising:

a third diode comprising an anode terminal and a cathode terminal, said anode terminal of said third diode coupled to said first terminal of said bias winding;

a third capacitor comprising a first terminal and a second terminal, said first terminal of said third capacitor coupled to said cathode terminal of said third diode and said second terminal of said third capacitor coupled to said second terminal of said bias winding;

a resistor comprising a first terminal and a second terminal, said first terminal of said resistor coupled to said first terminal of said second capacitor;

a zener diode comprising an anode terminal and a cathode terminal, said cathode terminal of said zener diode coupled to said second terminal of said resistor;

an isolation circuit comprising a first terminal, a second terminal, a third terminal and a fourth terminal, said first terminal of said isolation circuit coupled to said first terminal of said third capacitor, said second terminal of said isolation circuit coupled to said cathode terminal of said zener diode, said third terminal of said isolation circuit coupled to said second terminal of said second capacitor, and said fourth terminal of said isolation circuit providing said signal indicative of the power level supplied by said power supply.

12. The power supply of claim 8 wherein said first switch, said second switch and said pulse width modulator are included in an integrated circuit.

13. The power supply of claim 8 wherein said first switch and said second switch each comprise a transistor.

14. The power supply of claim 8 further comprising a standby circuit, said standby circuit comprising a second inductor having a first terminal and a second terminal, said second inductor magnetically coupled to said first inductor, said first terminal and said second terminal of said second inductor coupled to provide stand by power, said standby circuit providing a signal for turning off said second switch.

15. The power supply of claim 11 wherein said isolation circuit comprises a signal that turns off said second switch.

16. The power supply of claim 14 wherein said first switch operates at a lower frequency when said standby circuit turns off said second switch than when said second switch is operating.

17. The power supply of claim 11 wherein said isolation circuit comprises an optocoupler.

18. A power supply controller comprising:

a first switch being switched on and off at a first duty cycle;

a second switch being switched on and off at a second duty cycle; and a pulse width modulation controller comprising a first output coupled to said first switch and a second output coupled to said second switch, said pulse width modulation controller providing a first signal that switches said first switch at said first duty cycle and providing a second signal that switches said second switch at said second duty cycle, said first switch, second switch and pulse width modulator included in a single monolithic integrated circuit, said pulse width modulator including a single oscillator having an oscillator output, said first and second outputs generated in response to the oscillator output.

19. The power supply controller of claim 18 further comprising a first input terminal coupled to said pulse width modulation controller that receives a third signal and a second input terminal coupled to said pulse width modulation controller that receives a fourth signal, and wherein said pulse width modulation controller varies said first duty cycle according to said third signal and wherein said pulse width modulation controller varies said second duty cycle according to said fourth signal.

20. The power supply controller of claim 18 further comprising a transformer comprising a primary winding and a secondary winding and wherein said first signal is indicative of a voltage magnitude at said primary winding.

21. The power supply controller of claim 20 wherein said signal is indicative of a voltage at said secondary winding.

22. The power supply controller of claim 18 wherein said first switch and said second switch each comprise a transistor.

23. The power supply controller of claim 19 wherein said pulse width modulation controller comprises:
- a first comparator having a first input coupled said oscillator output, a second input coupled to said first input terminal and an output coupled to said first switch; and
- a second comparator having a first input coupled said oscillator output, a second input coupled to said second input terminal and an output coupled to said second switch.

24. A power supply, comprising:
- a rectifier having an input and an output, the input of the rectifier coupled to an AC power source;
- a pulse width modulator controller coupled to the output of the rectifier to regulate an output DC voltage of the power supply;
- a first capacitor coupled to the output of the rectifier and to the pulse width modulator controller such that the first capacitor is both a filter capacitor and a loop compensation capacitor of the power supply;
- a first inductor coupled between the rectifier and the pulse width modulator controller; and
- a first diode coupled between the first inductor and the first capacitor.

25. The power supply of claim 24 wherein the output of the rectifier includes a positive output terminal and a negative output terminal, the power supply further comprising a first switch having a first terminal, a second terminal and a control terminal, the first terminal of the first switch coupled to a second terminal of the first inductor, the second terminal of the first switch coupled to the negative output terminal of the rectifier, the control terminal of the first switch coupled to the pulse width modulator.

26. A method of modulating a power supply, the method comprising the steps of:
- rectifying an AC power source;
- pulse width modulating the rectified AC power source to regulate an output DC voltage of the power supply; and
- filtering an output current of the power supply with a first capacitor, the first capacitor also serving as a compensation capacitor for a pulse width modulator control loop of the power supply.

27. The method described in claim 26 including the additional step of reducing distortion in an AC power source current of the power supply.

* * * * *